(12) United States Patent
Shigematsu (10) Patent No.: US 7,516,825 B2
(45) Date of Patent: Apr. 14, 2009

(54) CLUTCH MECHANISM

(75) Inventor: Takeshi Shigematsu, Ehime (JP)

(73) Assignee: Shigematsu Co., Iyo-Gun Ehime (JP)

( * ) Notice: Subject to any disclaimer, the term of this patent is extended or adjusted under 35 U.S.C. 154(b) by 0 days.

(21) Appl. No.: 12/194,816

(22) Filed: Aug. 20, 2008

(65) Prior Publication Data

US 2008/0308377 A1    Dec. 18, 2008

Related U.S. Application Data

(62) Division of application No. 10/558,301, filed as application No. PCT/JP2004/007658 on May 27, 2004, now Pat. No. 7,428,955.

(30) Foreign Application Priority Data

May 28, 2003    (JP)    ............................ 2003-003960

(51) Int. Cl.
*F16D 13/54* (2006.01)
*F16D 43/12* (2006.01)
(52) U.S. Cl. .................. 192/70.29; 192/83; 192/105 C
(58) Field of Classification Search ............... 192/52.4, 192/103 A, 70.29
See application file for complete search history.

(56) References Cited

U.S. PATENT DOCUMENTS

| 2,195,354 A | 3/1940 | Bateman |
| 5,575,367 A | 11/1996 | Romanelli |
| 7,082,661 B2 * | 8/2006 | Ijames et al. ................ 29/401.1 |

FOREIGN PATENT DOCUMENTS

| JP | 55-44166 | 3/1980 |
| JP | 58-52341 | 4/1983 |
| JP | 59-131033 | 7/1984 |
| JP | 2-32894 | 9/1990 |
| JP | 4-30428 | 7/1992 |

\* cited by examiner

*Primary Examiner*—Richard M. Lorence
*Assistant Examiner*—Edwin A. Young
(74) *Attorney, Agent, or Firm*—Sughrue Mion, PLLC (57) ABSTRACT

A clutch mechanism has rotational driving force outputting members connected to a rotational driving force input system, rotational driving force receiving members connected to a rotational driving force output system, and a pressing mechanism for pressing the rotational driving force outputting members against the rotational driving force receiving members to keep the rotational driving force outputting members and the rotational driving force receiving members in contact with each other. The pressing mechanism has a constant load applying means and a variable load applying means for together generating the pressing force which brings and keeps the rotational driving force outputting members and the rotational driving force receiving members in contact with each other. A value of a load generated by the constant load applying means being set to be less than the maximum non-slide limit, i.e., the maximum of the non-slide limit which is required for keeping the rotational driving force outputting members and the rotational driving force receiving members in contact with each other to transfer the rotational driving force.

2 Claims, 10 Drawing Sheets

CLUTCH MECHANISM

CROSS-REFERENCE TO RELATED APPLICATION

This is a Divisional of application Ser. No. 10/558,301 filed Nov. 28, 2005, which is a 371 of PCT Application No. PCT/JP2004/007658 filed May 27, 2004. The above-noted applications are incorporated herein by reference in their entirety.

TECHNICAL FIELD

The present invention relates to a clutch mechanism which is used in a motor vehicle such as a two-wheeled motor vehicle, a four-wheeled motor vehicle or the like.

BACKGROUND ART

A clutch mechanism plays roles to transfer rotational driving force which is inputted via a rotational driving force input system (hereinafter referred to as "input system") to a rotational driving force output system (hereinafter referred to as "output system") and to discontinue the transfer. The clutch mechanism has friction plates which are connected to the input system and clutch plates which are connected to the output system and brought into pressure contact with the friction plates. Accordingly, engagement and disengagement between the input system and the output system are effected by bringing the friction plates and the clutch plates into pressure contact with each other and by releasing the friction plates and the clutch plates from the pressure contact, respectively.

The pressure contact between the friction plates and the clutch plates is effected by pressing the friction plates against the clutch plates, and the pressing of the friction plates is effected by means of a clutch pressing mechanism. The clutch pressing mechanism has a pressure plate which directly presses the friction plates, an elastic member which supplies the pressing force to the pressure plate, and a retainer which applies a load to a spring portion of the elastic member.

The spring load of the elastic member is determined as follows. First, from a maximum torque value of a motor vehicle such as a two-wheeled motor vehicle, a necessary clutch load which is required for preventing slide from occurring between the friction plates and the clutch plates is determined. Then, the spring load of the elastic member is so determined that the load with which the pressure plate presses the friction plates is greater than the necessary clutch load.

As described above, the spring load of the elastic member is determined on the basis of the maximum torque value and set to be constant irrespective of an engine speed. It is thereby possible to prevent slide between the friction plates and the clutch plates over a whole range of the engine speed.

On the other hand, however, since the spring load of the elastic member is determined on the basis of the maximum torque value, the spring load is inevitably large in a case of a motor vehicle in which engine torque is high.

In particular, in a case of a two-wheeled motor vehicle, a pressure plate with which a clutch pressing mechanism is provided and which directly presses friction plates is operated by a clutch lever handled by a driver. In other words, by driver's grasping of the clutch lever, the pressure plate is moved against a spring load of an elastic member, and the friction plates are released from the pressing applied thereto by the pressure plate. The pressure contact between clutch plates and the friction plates is thereby removed to effect discontinuation of transfer of rotational driving force inputted via an input system to an output system, i.e., so-called "disengagement of clutch". Thus, when "disengagement of clutch" is effected, the driver is required to grasp a clutch lever with a force capable of overcoming the spring load of the elastic member to operate the clutch lever.

Accordingly, in driving of a two-wheeled motor vehicle with a high torque engine, a driver is likely to be required to apply a large force to the clutch lever to effect manual operation thereof. This puts a heavy burden on the driver.

Actually, in driving of a two-wheeled motor vehicle with a high torque engine for a long time, or in driving along a street with a high traffic density which requires gear shiftings repeatedly, driver's grasping power is likely to be susceptible to lowering. To tackle such situations, enhancement of physical strengths such as grasping power and the like and high driving skill which enables smooth gear shifting are required. Under these circumstances, those who can enjoy driving of a two-wheeled motor vehicle have been a limited number of people. Further, in a case of women, they often have soft grips. Accordingly, due to difficulty in clutch lever operation itself, types of motor vehicles of which driving they can enjoy have tended to be restricted.

As a method for reducing a force required for operating a clutch lever, there has been a method in which amount of movement of a pressure plate is reduced as compared with that in a conventional clutch mechanism. By this method, however, it has not been easy to realize accuracy in removing a pressing force applied by the pressure plate to friction plates and ensuring a condition where pressure contact between the friction plates and the clutch plate is surely removed.

Further, in Japanese Unexamined Patent Publication No. Hei8-61389 (No. 61389/1996), as a structure for reducing a clutch pedal treadling force in a clutch pressing assembly having a diaphragm spring as an elastic member, there is disclosed such a structure that when a clutch is engaged, a pressing force of a pressing member is multiplied by a lever mechanism and the greater pressing force is exerted on a pressure plate, and by adjusting a lever ratio of a lever member of the lever mechanism, a pressing force of a diaphragm spring is set to be at a low level to reduce a clutch pedal treadling force.

In this clutch pressing assembly, however, only an elastic member in the form of a diaphragm spring which provides a constant load is used. Accordingly, if the constant spring load is set to be small, the load with which the pressure plate presses friction plates is reduced over a whole range of engine speed. Therefore, pressure contact between the friction plates and clutch plates is not necessarily ensured over a whole range of engine speed. For example, when the engine speed is high, the pressure contact is not ensured.

As described above, it has not necessarily been easy to concurrently satisfy the demand to reduce a force required for operating a clutch lever and the demand to increase a force with which a clutch pressing mechanism presses friction plates, and further, to ensure pressure contact between the friction plates and clutch plates over a whole range of engine speed.

Under such circumstances, it is an object of the present invention to provide a clutch disc pressing assembly which is capable of maintaining a force with which a clutch pressing mechanism presses friction plates to ensure pressure contact between the friction plates and clutch plates over a whole range of engine speed, and yet which enables many people to enjoy driving of a motor vehicle irrespective of their physical strengths.

DISCLOSURE OF INVENTION

The clutch mechanism according to the present invention comprises:

rotational driving force outputting members connected to a rotational driving force input system;

rotational driving force receiving members attached connected to a rotational driving force output system;

a pressing mechanism for pressing the rotational driving force outputting members against the rotational driving force receiving members to keep the rotational driving force outputting members and the rotational driving force receiving members in contact with each other; and a disengaging means for releasing the rotational driving force outputting members and the rotational driving force receiving means from the pressing force which keeps them in contact with each other;

the pressing mechanism having a constant load applying means and a variable load applying means for together generating the pressing force which brings and keeps the rotational driving force outputting members and the rotational driving force receiving members in contact with each other, a value of the pressing load generated by the constant load applying means and the variable load applying means being kept in excess of a non-slide limit which is required for keeping the rotational driving force outputting members and the rotational driving force receiving members in contact with each other to transfer the rotational driving force, a value of a load generated by the constant load applying means being set to be less than the maximum non-slide limit, i.e., the maximum of the non-slide which is required for keeping the rotational driving force outputting members and the rotational driving force receiving members in contact with each other to transfer the rotational driving force.

In this connection, the non-slide limit is a load set to be a lower limit of the pressing force between the rotational driving force outputting members and the rotational driving force receiving members which is required for allowing no slide to occur between the rotational driving force outputting members and the rotational driving force receiving members. Specifically, the non-slide limit is a load which is calculated according to characteristics of an engine, a clutch mechanism and the like on the basis of an engine torque.

The maximum non-slide limit is the non-slide limit at the maximum of the rotational driving force transferred from the rotational driving force input system to the rotational driving force output system.

According to the present invention, since the value of the load generated by the constant load applying means is set to be smaller than the maximum non-slide limit, reduction of a force required for a driver to operate a clutch lever (hereinafter referred to as "force required for operating a clutch lever") can be realized. Further, since the value of the load generated by the constant load applying means and the variable load applying means is set to be in excess of the non-slide limit, a pressure contact between the rotational driving force outputting members and the rotational driving force receiving members can be ensured irrespective of an engine output.

A feature of the clutch mechanism according to the present invention resides in that the pressing mechanism has a first pressing member which is disposed facing the rotational driving force outputting members to be capable of being kept in contact therewith and a second pressing member connected to the rotational driving force receiving members, and the elastic load applying means is disposed and compressed between the first pressing member and the second pressing member.

By providing such a structure, the elastic load applying means biases the first pressing member toward the rotational force outputting members. The value of the load generated by the elastic load applying means is thereby set.

A feature of the clutch mechanism according to the present invention resides in that the centrifugal load applying means comprises a plurality of supports annularly disposed on the second pressing member and centrifugal mechanisms respectively supported by the supports, and the centrifugal mechanisms have swing members so supported respectively by the supports as to be swingable thereon, and each of the swing members has an operative portion formed at its one end facing the first pressing member and a mass body provided on the other end.

By providing such a structure, centrifugal forces are exerted on the mass bodies by rotation of the second pressing member, and the swing members thereby swing on the supports. Consequently, the operative portions formed at the one ends of the swing members are urged to press the first pressing member. In this manner, the centrifugal load applying means provides the centrifugal load.

A feature of the clutch mechanism according to the present invention resides in that the first pressing member and the second pressing member are concentrically disposed, and the elastic load applying means is a diaphragm spring, and the diaphragm spring has an annular portion and a plurality of levers which inward extend from the annular portion and of which tips are free ends, and the annular portion has its circumferential edge supported by a protrusion formed on a circumferential edge of the first pressing member, and the plurality of levers are supported by the second pressing member, and an operative portion of a swing member of each of the centrifugal mechanisms so extends through a slot between adjacent levers as to be permitted to bias the first pressing member.

By providing such a structure, the diaphragm spring as the elastic load applying means is compressedly disposed between the first pressing means and the second pressing means. Further, a centrifugal load can be generated by the action of the centrifugal mechanisms mounted on the second pressing member.

A feature of the clutch mechanism according to the present invention resides in that a centrifugal load transfer member is disposed between the first pressing member and the diaphragm spring, and an operative portion of each of the centrifugal mechanisms of the second pressing member is permitted to bias the first pressing member via the centrifugal load transfer member.

Further, a feature of the clutch mechanism according the present invention resides in that the centrifugal load transfer member has an annular portion and a plurality of plate portions outward extending from the circumferential edge of the annular portion, and the plate portions are located at positions corresponding to the slits, respectively.

By providing such a structure, the operative portions of the centrifugal mechanisms can bias the first pressing member via the plate portions. Accordingly, areas of portions which are pressed against the first pressing member are larger than those in the case where the first pressing member is directly biased by means only of the operative portions. This enables the centrifugal load applying means to more efficiently bias the first pressing member.

A feature of the clutch mechanism according to the present invention resides in that on a side of the second pressing member which faces the diaphragm spring, protuberances are formed in a ring, and the protuberances are pressed against the levers in the vicinity of the free ends, and the diaphragm spring is thereby compressedly disposed.

By providing such a structure, the elastic load applying means is retained in a compressed condition by the protrusion formed on the circumferential edge of the first pressing member and the protuberances formed in the second pressing means. The diaphragm spring thereby biases the first pressing member toward the rotational driving force outputting members. In this manner, the diaphragm spring provides the constant load.

A feature of the clutch mechanism according the present invention resides in that an inner diameter of the ring in which the protuberances are formed (hereinafter referred to as "retainer ring diameter") is so determined that the value of the load generated by the elastic load applying means is smaller than the maximum non-slip limit.

By providing such a structure, the retainer ring diameter is reduced, and reduction of the load generated by the elastic load applying means is thereby realized. In this manner, by the extremely simple structure, it is possible to obtain a clutch mechanism capable of realizing reduction of a force required for operating a clutch lever.

As described above, the present invention is characterized in that in a low engine speed condition where the pressing force of the pressing mechanism which is exerted on the rotational driving force outputting members is not required to be so strong, the pressing force is moderated, and in a high engine speed condition where the pressing force is required to be stronger, the pressing force is reinforced as number of revolutions of the rotational driving force receiving members increases.

In other words, in the present invention, the pressing force of the pressing mechanism which is exerted on the rotational driving force outputting members is variable so as to be at a required level only when required to be so. By virtue of this, a force required for operating a clutch lever can be greatly reduced as compared with a conventional two-wheeled motor vehicle in which a pressing force of a pressing mechanism that is exerted on rotational driving force outputting members is set to be constant based on a pressing force required at a time when the maximum torque is generated.

Accordingly, by employing the clutch mechanism according to the present invention in a two-wheeled motor vehicle, many people can enjoy driving of a two-wheeled motor vehicle irrespective of their physical strengths, while ensuring a sufficient pressing force of the clutch pressing mechanism on the friction plates.

BEST MODE FOR CARRYING OUT THE INVENTION

In the following, the embodiments of the present invention will be described in detail with reference to the drawings.

EMBODIMENT 1

Figure 1A:
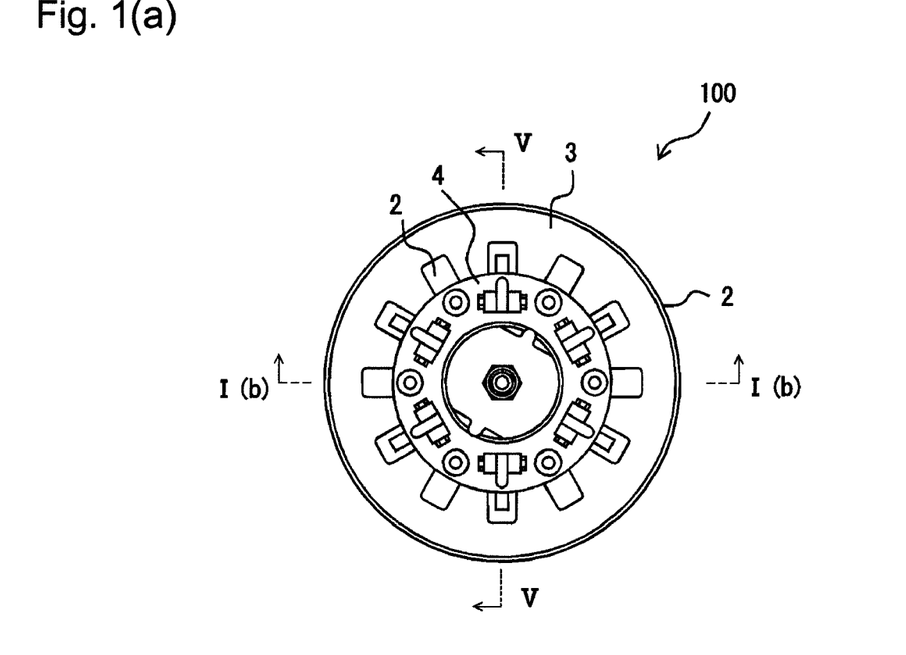
FIG. 1(a) is a plan view of a clutch mechanism 100 as an embodiment 1 of the present invention.
Figure 1B:
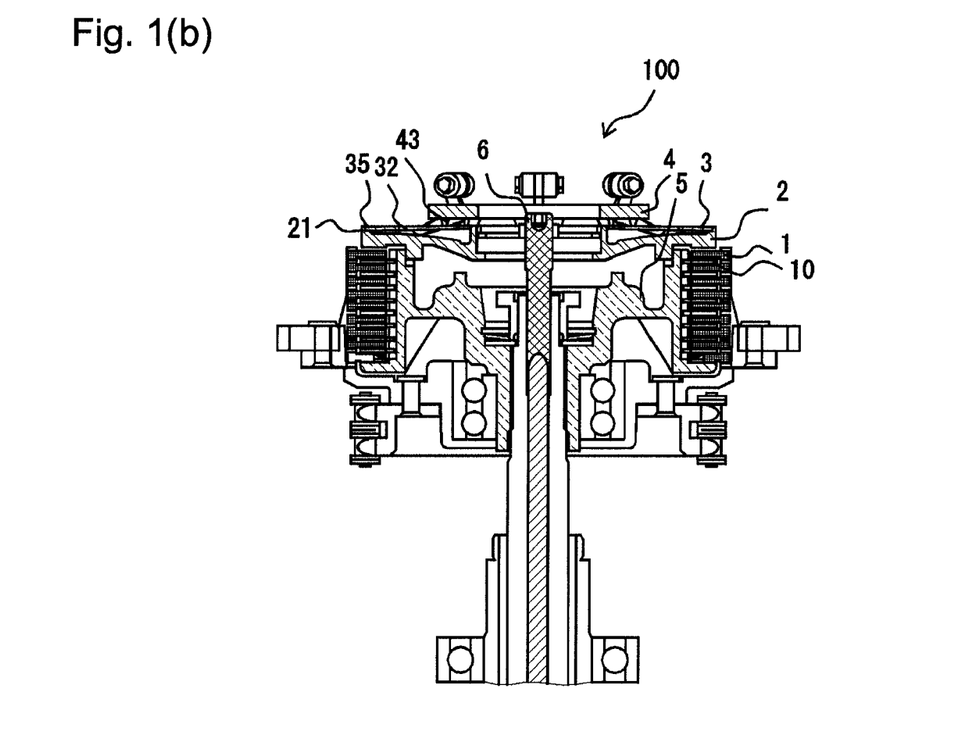
FIG. 1(b) is a sectional view taken along line I(b)-I(b) in FIG. 1(a).

FIG. 1(a) is a plan view of a clutch mechanism 100 as an embodiment 1 of the present invention, and FIG. 1(b) is a sectional view taken along line I(b)-I(b) in FIG. 1(a).

The clutch mechanism 100 plays roles to transfer rotational driving force which is inputted via an input system (not shown) to an output system (not shown) and to discontinue the transfer. In this connection, the input system comprises an engine and a series of well-known mechanism parts which are operatively connected to the engine to transfer rotational driving force of the engine to the clutch mechanism 100. The output system comprises a series of well-known mechanism parts which receive the driving force of the engine via the clutch mechanism 100 and output the driving force to power a driving wheel or driving wheels.

The clutch mechanism 100 has a plurality of friction plates 1 as rotational driving force outputting members connected to the input system, a plurality of clutch plates 10 as rotational driving force receiving members connected to the output system, and a clutch pressing mechanism for keeping the friction plates 1 and the clutch plates 10 in contact with each other.

The clutch pressing mechanism comprises a retainer 4, a pressure plate 2 and a diaphragm spring 3 which are coaxially disposed with each other, with an adjuster screw 6 as the axis thereof. In other words, the clutch pressing mechanism has the pressure plate 2 as a first pressing member which faces the friction plates 1 for directly pressing the friction plates 1, and the retainer 4 as a second pressing member which is fixed to an inner hub 5 connected to the clutch plates 10. Further, the clutch pressing mechanism has the diaphragm spring 3 which is disposed under compression between the pressure plate 2 and the retainer 4 as a constant load-applying means, i.e., as an elastic load-applying means for biasing the pressure plate 2 toward the friction plates 1.

The pressure plate 2 disposed facing the friction plates 1 is connected to the adjuster screw 6 as a disengaging means. The adjuster screw 6 is operated with a clutch lever (not shown) which is manually operated by a driver. In other words, by operation of the clutch lever by a driver, the pressure plate 2 is moved in a direction parallel to the axis of the adjuster screw 6 (hereinafter referred to as "axial direction"). The pressing force which keeps the friction plates 1 and clutch plates 10 in contact with each other is thereby removed.

Figure 2A:
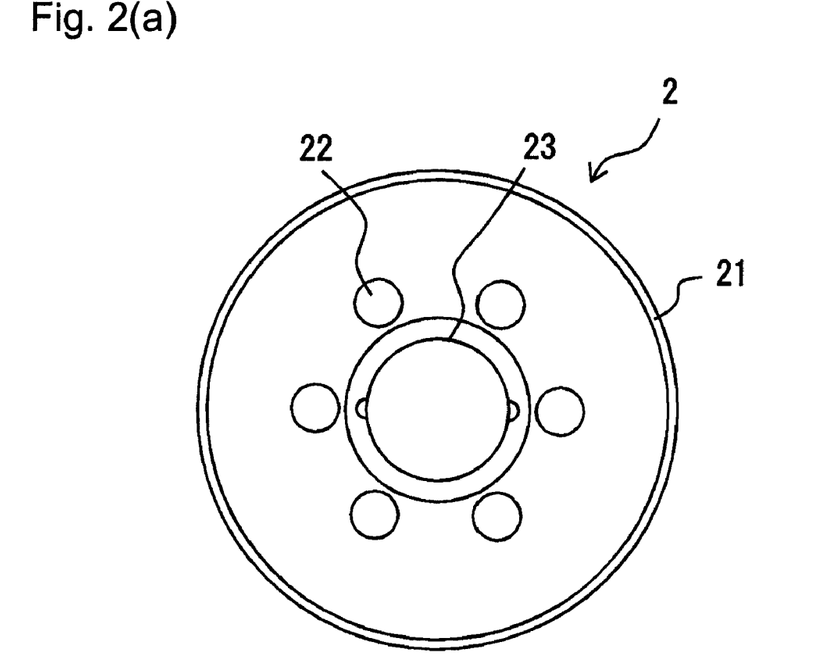
FIG. 2(a) is a plan view of a pressure plate in the clutch mechanism 100 according to the present invention.
Figure 2B:
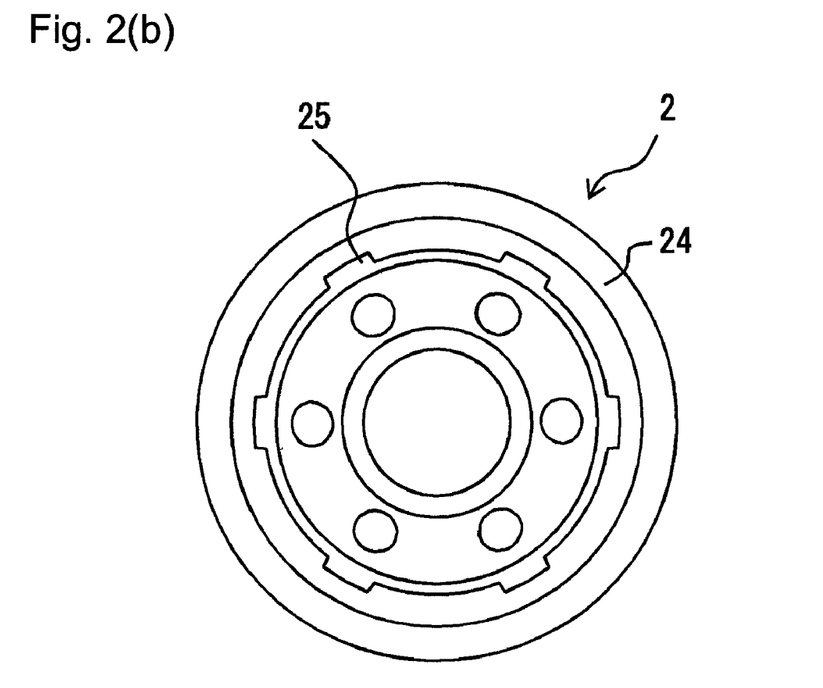
FIG. 2(b) is a rear view of the pressure plate in the clutch mechanism 100 according to the present invention.

FIG. 2(a) is a plan view of the pressure plate 2, and FIG. 2(b) is a rear view of the pressure plate 2.

The pressure plate 2 is an annular member, and it has an opening 23 at its center, and a plurality of holes 22 trough which cylindrical portions (not shown) formed in the inner hub 5 are inserted. On a side of the pressure plate 2 which faces the diaphragm spring 3, an annular protrusion 21 is formed along the circumferential edge. On the side of the pressure plate 2 which faces the friction plates 1, a pressing portion 24 is circumferentially formed which directly presses the friction plates 1, and a plurality of protrusions 25 are formed which fit into grooves (not shown) formed in the inner hub 5 when the friction plates 1 are pressed. The pressure plate 2 is attached to the adjuster screw 6 via the opening 23 (The pressure plate 2 is attached to the adjuster screw 6 in such a manner that the adjuster screw is inserted through the opening 23).

Figure 3:
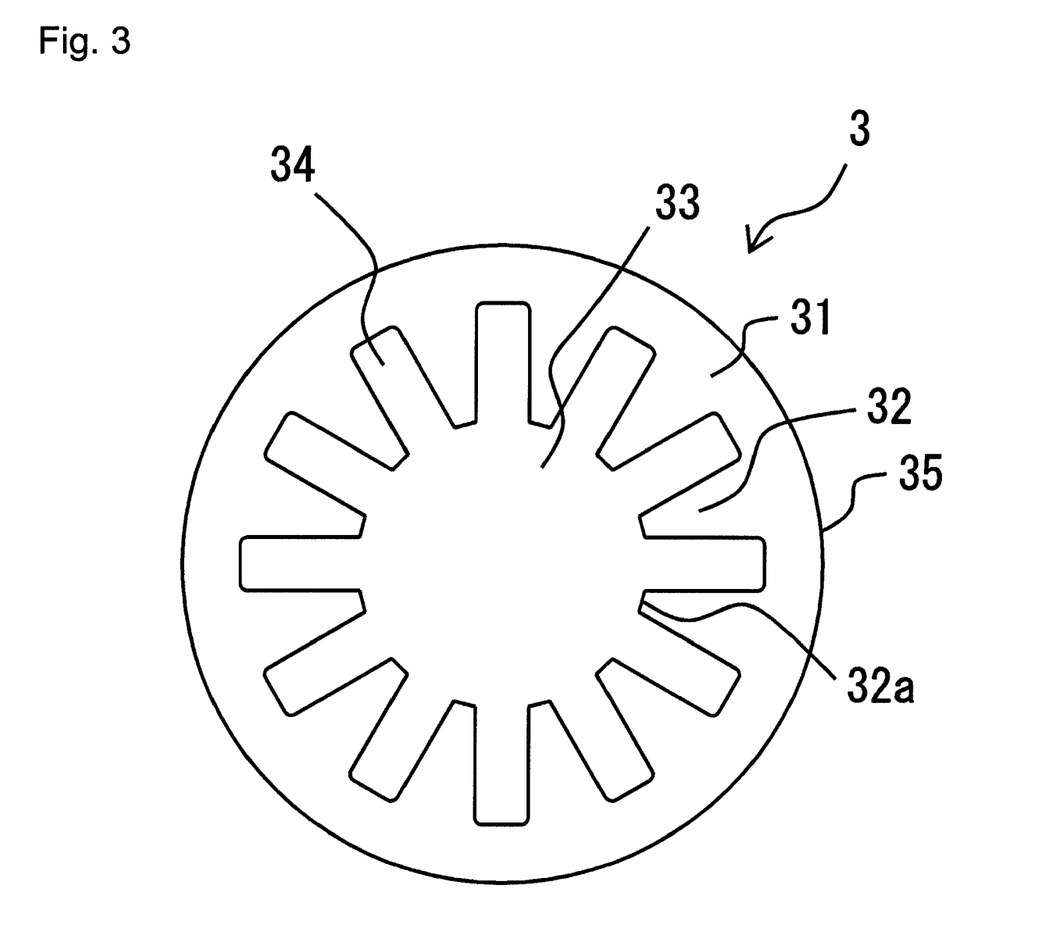
FIG. 3 is a plan view of a diaphragm spring in the clutch mechanism 100 according to the present invention.

FIG. 3 is a plan view of the diaphragm spring 3.

The diaphragm spring 3 has an annular portion 31 and a plurality of lever portions 32 which taperingly extend from the inner circumference of the annular portion 31 toward the center of the circle and which have spring function. The lever portions 32 are provided at circumferentially regular intervals, and tips thereof are free ends 32a. At the central portion of the diaphragm spring 3 inside the tips, i.e., free ends 32 a of the lever portions 32, an opening 33 is formed. As a result of the fact that the lever portions 32 are circumferentially provided at regular intervals, slits 34 are formed between the lever portions 32 in such a manner that the slits 34 radially extend outward from the opening 33 at regular intervals with a lever portions 32 between neighboring two slits.

A circumferential edge 35 of the diaphragm spring 3 is supported by the annular protrusion 21 of the pressure plate 2.

The diaphragm spring 3 has such a bowl-like shape that when the circumference of the diaphragm spring 3 is supposed to be a circumference of a circle, the diaphragm spring 3 is curved toward the pressure plate 2 from the center portion of the circle as the base of the bowl. Accordingly, in a condition where no load is applied to the diaphragm spring 3, the diaphragm spring 3 and the pressure plate 2 are in such a condition that only the circumferential edge 35 of the diaphragm spring 3 and the support 21 of the pressure plate 2 are in contact with each other.

Figure 4A:
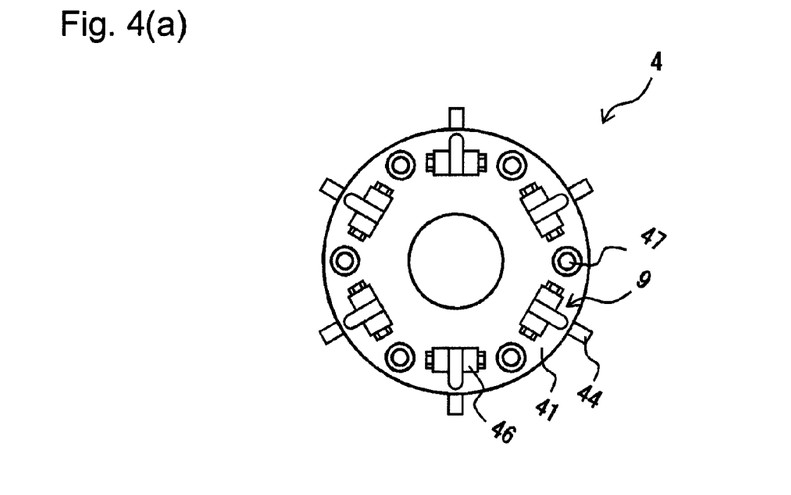
FIG. 4(a) is a plan view of a retainer in the clutch mechanism 100 according to the present invention.
Figure 4B:
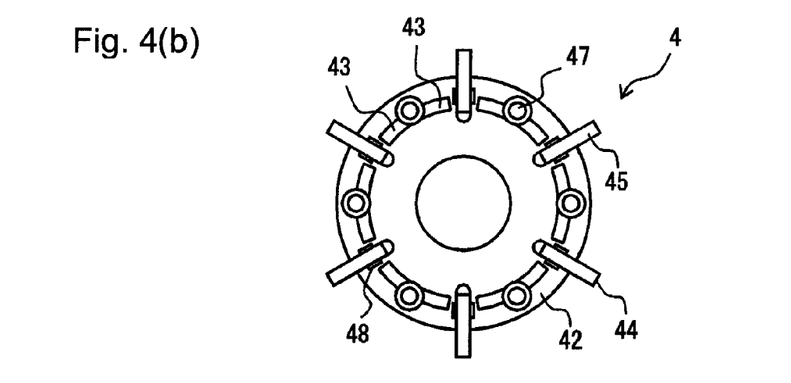
FIG. 4(b) is a rear view of the retainer in the clutch mechanism 100 according to the present invention.
Figure 4C:
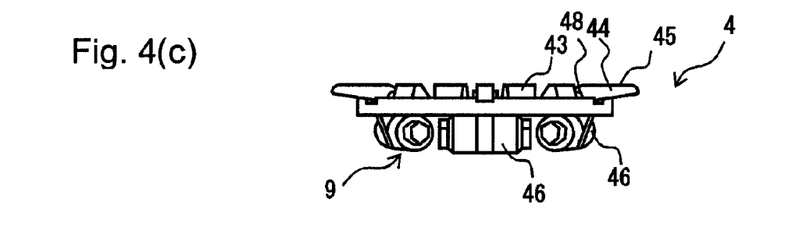
FIG. 4(c) is a side view of the retainer in the clutch mechanism 100 according to the present invention.
Figure 4D:
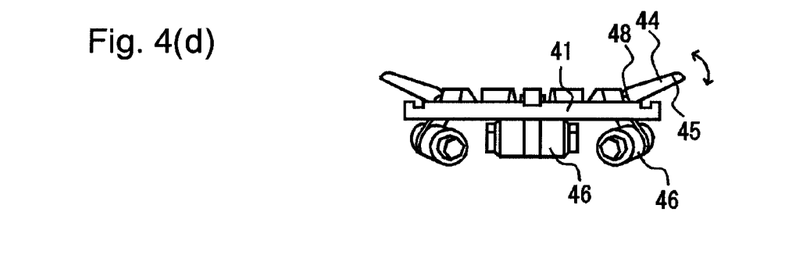
FIG. 4(d) is a side view showing L-shaped arms swinging in the retainer in the clutch mechanism 100 according to the present invention.

FIG. 4(a) is a plan view of the retainer 4, FIG. 4(b) is a rear view of the retainer 4, FIG. 4(c) is a side view of the retainer 4, and FIG. 4(d) is a side view showing L-shaped arms swinging in the retainer 4.

The retainer 4 is an annular member having an annular portion 41 and has a plurality of supports 48 disposed in a ring in the annular portion 41 and centrifugal mechanisms 49 supported by the supports 48 as centrifugal load-applying means.

On a side 42 of the retainer 4 which faces the diaphragm spring 3, a plurality of protuberances 43 are formed in such a manner that they are arranged in a ring. As shown in FIG. 1(b), the retainer 4 is disposed in such a manner that the protuberances 43 abut on the levers 32 of the diaphragm spring 3.

As shown in FIG. 4(d), the centrifugal mechanisms 49 have L-shaped arms 44 as swinging members which are supported by the supports 48 to be permitted to swing. Each of the L-shaped arms 44 has an operative portion 45 which is formed at its one end on the side of the pressure plate 2 and which is brought into contact with the pressure plate 2. On the end opposite to the operative portion 45, a mass body 46 as a cylindrical weight is provided, with the annular portion 41 therebetween. In the operative portion 45, a portion thereof which is brought into contact with the pressure plate 2 is so formed as to be even and smooth.

As a material for the L-shaped arms 44 and the operative portions 45 of the centrifugal mechanisms 49, it is preferred that a highly rigid and lightweight material such as an aluminum alloy be used. On the other hand, a material for the mass bodies 46 is not particularly required to have a high rigidity and is, preferably, one having a high specific gravity such as a brass.

By following these, the centrifugal mechanisms are improved in efficiency and enabled to generate a pressing load, which is attributable to centrifugal forces, highly precisely according to the variation in engine speed.

The centrifugal mechanisms 49 as described above are circumferentially disposed in the annular portion 41 at regular intervals to generate a circumferentially uniform pressing load.

It should be noted that the shape and the manner of mounting of the mass bodies 46 are not restricted to those in this embodiment, so long as there is provided such a structure that the mass bodies 46 are subjected to centrifugal forces and the L-shaped arms 44 thereby swing.

In each of areas between the centrifugal mechanisms 49 in the annular portion 41, a bolt insertion hole 47 through which a bolt is inserted is formed. The bolt insertion holes 47 are so positioned as to face a plurality of cylindrical portions with which the inner hub 5 is provided and which extend toward the retainer 4. The retainer 4 is fixed to the inner hub 5 with bolts through the bolt insertion holes 47 and the cylindrical portions.

Since the pressure plate 2 is slidable in the axial direction by operation of the clutch lever, there is provided such a structure that the diaphragm spring 3 is brought into a more compressed condition or a less compressed condition between the pressure plate 2 and the retainer 4.

The plurality of protrusions 25 formed in the pressure plate 2 fit into the grooves formed in the inner hub 5 connected to the output system, when the friction plates 1 are pressed by the pressure plate 2, i.e., in a condition where driving force from the input system is transferred to the output system. In other words, the pressure plate 2, the diaphragm spring 3 and the retainer 4 co-rotate together with the output system, and thus they are not allowed to rotate relative to the output system.

The L-shaped arms 44 of the centrifugal mechanisms 49 and the bolt insertion holes 47 are alternately disposed at regular intervals so as to correspond to the slits 34 of the diaphragm spring 3. Accordingly, this provides such a structure that the operative portions 45 of the L-shaped arms 44 are permitted to contact the pressure plate 2 through the slits 34 of the diaphragm spring 3.

By fixing the retainer 4 to the cylindrical portions of the inner hub 5 with the bolts, the diaphragm spring 3 is disposed and compressed between the retainer 4 and the pressure plate 2. In other words, the levers 32 of the diaphragm spring 3 are brought into an elastically deformed condition, and under such an elastically deformed condition, the levers 32 are supported by the protuberances 43 of the retainer 4. In consequence, a constant elastic load is applied to the pressure plate 2 through the annular protrusion 21 which supports the circumferential edge 35 of the diaphragm spring 3. By the constant elastic load, the pressure plate 2 biases the friction plates 1. Accordingly, in this embodiment, the constant load-applying means which generates the pressing force of the pressing mechanism to bring the rotational driving force outputting members and the rotational driving force receiving members and the rotational driving force receiving members into contact with each other is comprised of the diaphragm spring 3.

In the clutch mechanism of the present invention, the constant load with which the pressure plate 2 presses the friction plates 1 is preferably 60% or more and 98% or less, more preferably 65% or more and 95% or less, and most preferably 70% or more and 90% or less of a maximum non-slide limit, i.e., a non-slide limit at a maximum of rotational driving force which is transferred from the rotational driving force input system to the rotational driving force output system.

If the constant load is less than 60% of the maximum non-slide limit, extent of dependence on a variable load to obtain a pressing load exceeding a non-slide limit is too large so that design of the variable load, which is attributable to centrifugal forces, is difficult. On the other hand, if the constant load exceeds 98% of the maximum non-slide limit, no substantial improvement in operability of the clutch lever is observed.

If the constant load is less than 65% of the maximum non-slide limit, extent of dependence on the variable load to obtain a pressing load exceeding a non-slide limit is large so that design of the variable load is not easy. On the other hand, if the constant load exceeds 95% of the maximum non-slide limit, improvement in operability of the clutch lever is observed but insufficient.

If the constant load is less than 70% of the maximum non-slide limit, extent of dependence on the variable load to obtain a pressing load exceeding a non-slide limit is not small so that design of the variable load is hard in terms of accuracy. On the other hand, if the constant load exceeds 90% of the maximum non-slide limit, improvement in operability of the clutch lever is not insufficient but sufficiently comfortable operability of the clutch lever cannot be obtained.

In the clutch mechanism of the present invention, the variable load with which the pressure plate 2 presses the friction plates 1 is set as follows.

A total of a value of the variable load at an engine speed at a maximum of the rotational driving force which is transferred from the rotational driving force input system to the rotational driving force output system and a value of the constant load is represented by W, and the variable load is so set that W satisfies the following formula I.

$$1.01 \leq W/\text{maximum non-slide limit} \leq 1.10 \quad \text{I}$$

If the W/maximum non-slide limit is less than 1.01, safety factor for surely preventing occurrence of slide is not necessarily sufficient. On the other hand, if the W/maximum non-slide limit exceeds 1.10, comfortability in operation of the clutch lever is impaired.

Further, in the clutch mechanism of the present invention, when the engine speed is 1000 rpm to 5000 rpm, the variable load with which the pressure plate 2 presses the friction plates 1 is so set as to satisfy $0.0045 \leq$ variable load/engine speed (lb/rpm) $\leq 0.025$.

If the value of the variable load/engine speed is less than 0.0045, safety factor for surely preventing occurrence of slide is not necessarily sufficient. On the other hand, if the value of the variable load/engine speed exceeds 0.025, comfortability in operation of the clutch lever is impaired.

Function

Function of the clutch mechanism 100 in the embodiment 1 will be described with reference to FIG. 1(b) and FIG. 5.

When a driver grasps the clutch lever, the adjuster screw 6 connected to the clutch lever is moved toward the retainer 4. The pressure plate 2 is thereby moved in the direction away from the friction plates 1. In consequence of this, the pressing force of the pressure plate 2 which has been exerted on the friction plates 1 is removed. Accordingly, the friction plates 1 and the clutch plates 10 are released from the pressure contact therebetween, and "disengagement of clutch" is thereby effected.

At this time, since the pressure plate 2 is biased by the diaphragm spring 3 toward the friction plates 1, it is necessary for moving the pressure plate 2 in the direction away from the friction plates 1 that the driver grasp the clutch lever with a force which can resist the spring load exerted by the diaphragm spring 3. In other words, in order to effect "disengagement of clutch", the driver is required to grasp the clutch lever with a force which can resist the elastic load exerted by the elastic load-applying means.

In this connection, as shown in FIG. 1(b), the diaphragm spring 3 is disposed between the pressure plate 2 and the retainer 4. On one side of the diaphragm spring 3 which faces the pressure plate 2, the diaphragm spring 3 has its circumferential edge 35 supported by the annular protrusion 21 circumferentially formed in the pressure plate 2. On the other side of the diaphragm spring 3 which faces the retainer 4, the diaphragm spring 3 has its levers 32 supported by the protuberances 43 of the retainer 4.

Accordingly, in order to effect "disengagement of clutch", it is necessary that the levers 32 be so subjected to further compressive elastic deformation as to render the curved diaphragm spring 3 approximately planar, with the points at which the levers 32 of the diaphragm spring 3 are supported by the protuberances 43 of the retainer 4 as fulcra and with the circumferential edge 35 of the diaphragm spring 3 as a force-applying point.

As described above, to effect "disengagement of clutch", it is necessary to move the pressure plate 2 with a force which overcomes the rigidity of the levers 32 of the diaphragm spring 3. In other words, the driver is required to hold the clutch lever with a force which can elastically deform the levers 32 of the diaphragm spring 3.

On the other hand, transfer of rotational driving force inputted from the input system to the output system, i.e., so-called "engagement of clutch" is effected by releasing the clutch lever which the driver has held. In other words, by the release of the clutch lever by the driver, the pressure plate 2 is released from the restraint by the adjuster screw 6. In consequence thereof, the elastic load-applying means which has undergone the compressive elastic deformation between the pressure plate 2 and the retainer 4 biases the pressure plate 2 toward the friction plates 1 to thereby effect "engagement of clutch".

In this connection, if the points (fulcra) at which the diaphragm 3 is pressed by the protuberances 43 of the retainer 4 are present at locations near the bases of the levers 32 (at which locations, the rigidity is high), i.e., if the ring in which the protuberances 43 are disposed has a large inner diameter, the distances between the fulcra and the force-applying point which is the circumferential edge 35 of the diaphragm spring 3 are small. Accordingly, in such a case, a load necessary for elastically deforming the levers 32 of the diaphragm spring 3 is high, and thus, in order to effect "disengagement of clutch", the driver is required to hold the clutch lever with a larger force in excess of the load.

Therefore, in order to reduce the force necessary for operating the clutch lever, it is necessary that elastic load of the levers 32 of the diaphragm spring 3 be reduced. In order to reduce the elastic load, it is effective to increase the distances between the fulcra and the force-applying point. This is realized by shifting the points at which the diaphragm spring 3 is pressed by the protuberances 43 of the retainer 4 toward the tips of the levers 32. In other words, it is effective to reduce the retainer ring diameter.

When the retainer ring diameter is reduced, a load necessary for moving the pressure plate 2 to elastically deform the levers 32 of the diaphragm spring 3 is reduced to lead to reduction of a force with which the driver holds the clutch lever.

While the force necessary for operating the clutch lever is reduced by reducing the retainer ring diameter as described above, tightness of the pressure contact between the friction plates 1 and the clutch plates 10 is reduced. This is because the protuberances 43 of the retainer 4 press the levers 32 of the diaphragm spring 3 at positions where rigidity of the levers 32 is low, and accordingly, the force with which the diaphragm spring 3 biases the pressure plate 2 toward the friction plates 1, namely, the elastic load is reduced.

Figure 5:
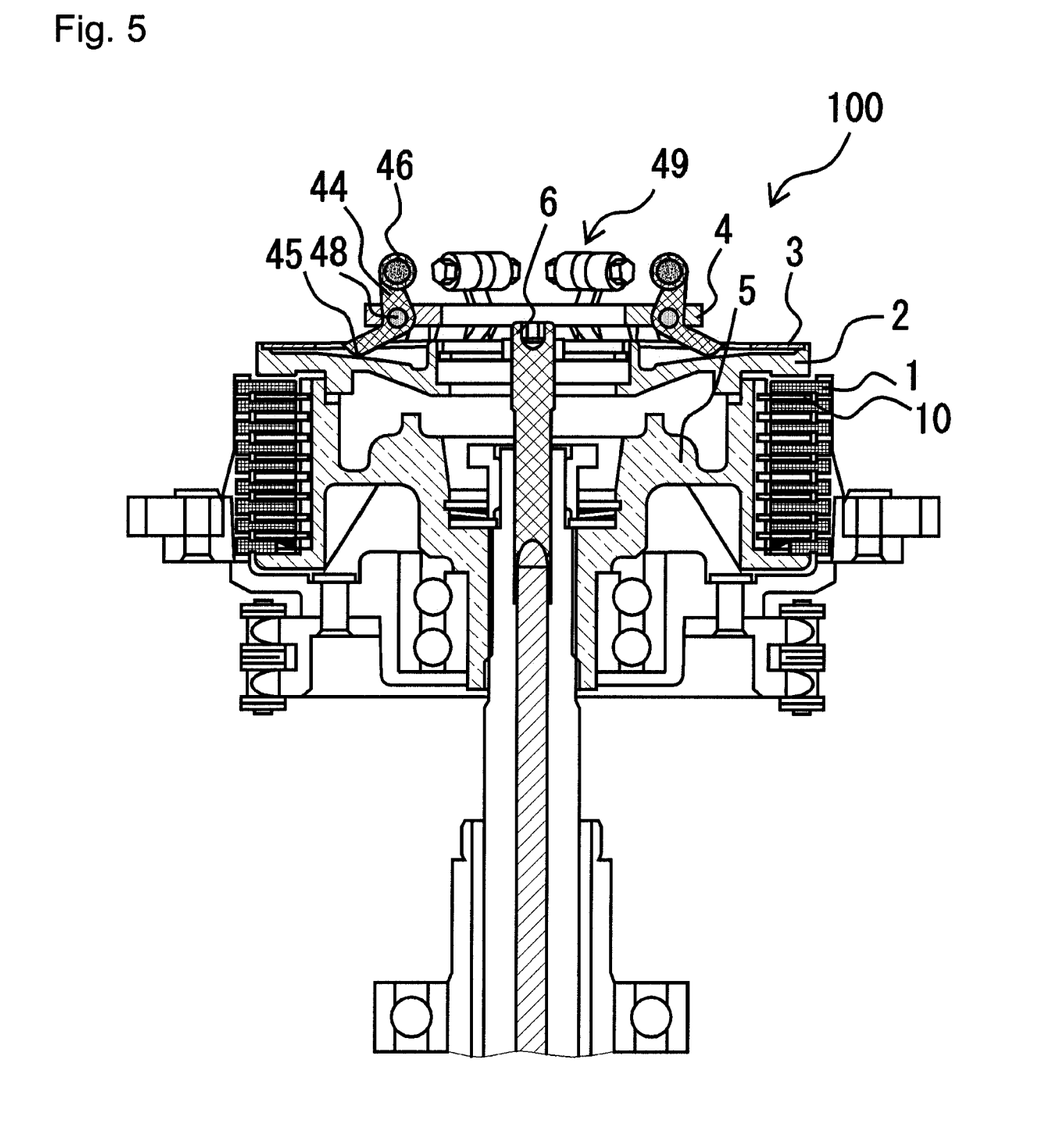
FIG. 5 is a sectional view taken along line V-V in FIG. 1(a).

To cope therewith, as structures for compensating the decrement of the elastic load, the centrifugal mechanisms 49 which are mounted on the retainer 4 function as shown in FIG. 5.

FIG. 5 is a sectional view taken along line V-V in FIG. 1(a), which shows such a condition that a variable load is exerted on the pressure plate in the clutch mechanism 100 as the embodiment 1 of the present invention.

As described above, in a condition where the rotational driving force inputted through the input system is transferred to the output system, i.e., in a "clutch is in engagement" condition, the retainer 4 is rotated together with the output system.

By the rotation of the retainer 4, a centrifugal force toward the outside of the retainer 4 is exerted on each of the mass bodies 46 attached to the L-shaped arms 44. By the centrifugal force, the mass bodies 46 are moved in the direction away from the center of the retainer 4 and the L-shaped arms 44 swing on the supports 48. The operative portions 45 of the L-shaped arms 44 are brought into contact with the pressure plate 2 through the slits 34 of the diaphragm spring 3.

Accordingly, when number of revolutions of the output system is increased, number of revolutions of the retainer 4 is also increased to increase the centrifugal force toward the outside of the retainer 4 which is exerted on each of the mass bodies 46. The forces of the operative portions 45 of the L-shaped arms 44 to bias the pressure plate 2 are thereby increased. The forces to bias the pressure plate 2 constitute a variable centrifugal load.

In this manner, the increase in the centrifugal forces exerted on the mass bodies with the increase in the number of revolutions of the output system is utilized to thereby compensate the decrease in the elastic load with the centrifugal forces, enabling the pressure contact between the friction plates 1 and the clutch plates 10 which is capable of preventing slide therebetween to be ensured.

As described above, according to the clutch mechanism 100, the reduction of the elastic load by the diaphragm spring is realized by reducing the retainer ring diameter. Accordingly, by the extremely simple structure, the clutch mechanism is obtainable which is capable of reducing a force required for operating a clutch lever. Further, since the reduction in the elastic load can be compensated with the centrifugal load, necessary strength tightness of the pressure contact between the friction plates 1 and clutch plates 10 can be ensured even in a condition where engine speed is high.

Further, when a two-wheeled motor vehicle which employs the clutch mechanism according to the present invention is driven, a force with which a driver holds a clutch lever and which the driver keeps after "disengagement of clutch" in gear changing is not so considerable. In regard to this, a description will be given with reference to the side views of the retainer 4 in FIG. 4.

FIG. 4(d) is a side view showing a "clutch is in engagement" condition, i.e., a condition of the retainer 4 when a driver does not hold the clutch lever, and FIG. 4(c) is a side view showing a "clutch is in disengagement" condition, i.e., a condition of the retainer 4 when a driver holds the clutch lever.

First, in the "clutch is in engagement" condition, centrifugal forces toward the outside of the retainer 4 are exerted on the mass bodies 46 of the L-shaped arms 44 by rotation of the retainer 4, and thus the operative portions 45 are in contact with the pressure plate 2, as shown in FIG. 4(d).

Next, in the "clutch is in disengagement" condition where a driver holds the clutch lever, i.e., a condition where the pressure plate is moved toward the diaphragm spring and the diaphragm spring is compressed against the retainer 4, the L-shaped arms 44 with which the retainer 4 is provided are reversely pressed by the pressure plate. At this time, the L-shaped arms 44 swing on the supports 48 in such a manner that the mass bodies 46 are moved toward the center of the retainer 4, as shown in FIG. 4(c). In this manner, since the mass bodies 46 are located at inner positions in the retainer 4 in the "clutch is in disengagement" condition as compared with the "clutch is in engagement" condition shown in FIG. 4(d), centrifugal forces exerted on the mass bodies 46 are smaller.

As described above, in the clutch mechanism of the present invention, when the engine speed increases and exceeds a certain level, the centrifugal load increases and the force required for operating the clutch lever thereby becomes large. However, when the clutch lever is once held, the centrifugal load becomes low. Accordingly, the force for maintaining the clutch mechanism in the "clutch is in disengagement" condition when the clutch lever is grasped is not so considerable.

In a process where the two-wheeled motor vehicle stops, as the number of revolutions of the output system decreases, the number of revolutions of the retainer 4 decreases to reduce the centrifugal load. Further, in a condition where the two-wheeled motor vehicle has completely stopped, no centrifugal load is exerted and only the elastic load is exerted.

Accordingly, a force to grasp the clutch lever and maintain the grasping of the clutch lever until the next start is markedly reduced as compared with conventional clutches.

As described in the above, according to the clutch mechanism of the present invention, a large number of people are enabled to enjoy driving of a two-wheeled motor vehicle irrespective of their physical strengths, while maintaining the force with which the clutch pressing mechanism presses the friction plates sufficiently, i.e., while ensuring the tightness of the pressure contact between the friction plates and the clutch plates.

EMBODIMENT 2

Figure 6A:
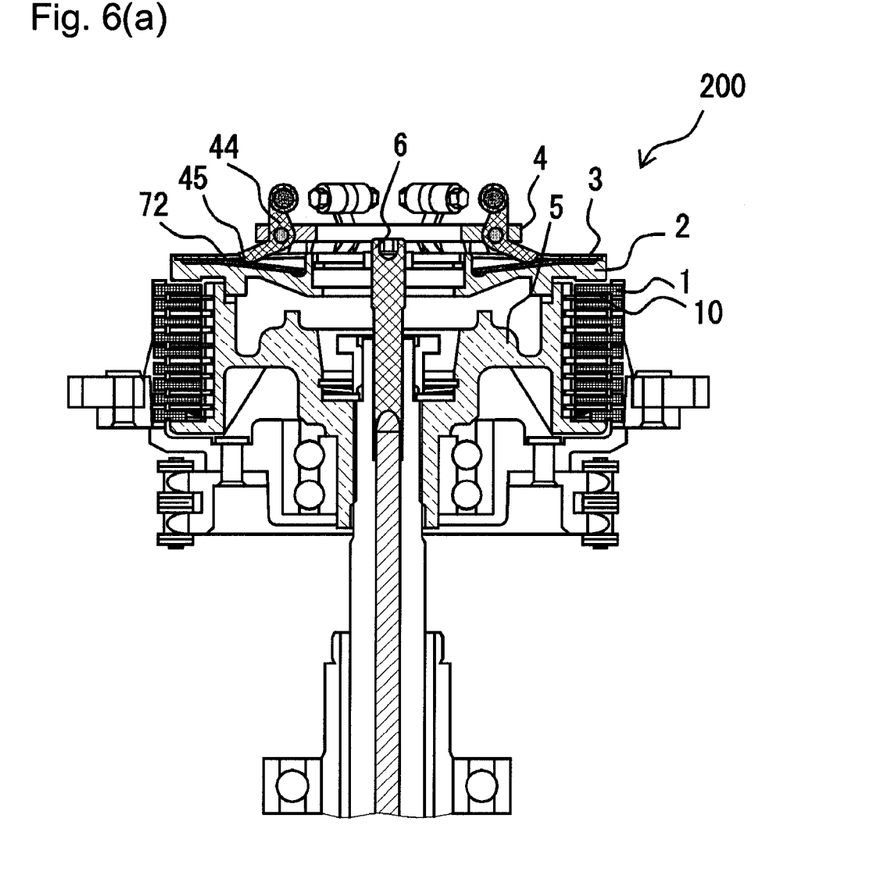
FIG. 6(a) is a sectional view of a clutch mechanism 200 as an embodiment 2 of the present invention.
Figure 6B:
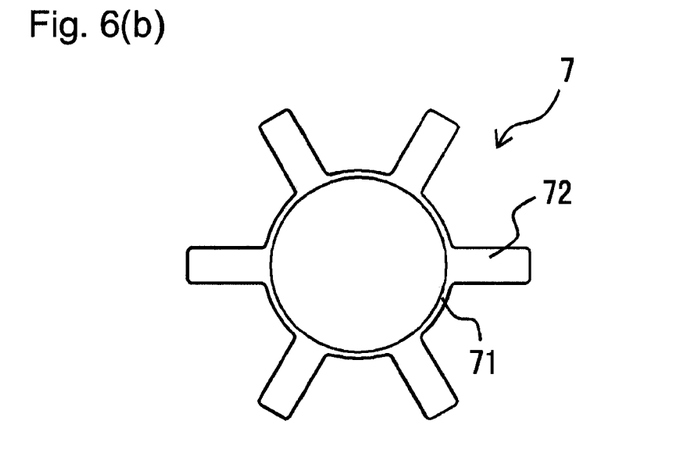
FIG. 6(b) is a plan view of a base plate in the clutch mechanism 200 according to the present invention.

FIG. 6(a) is a sectional view of a clutch mechanism 200 as an embodiment 2 of the present invention, and FIG. 6(b) is a plan view of a base plate 7.

The embodiment 1 has such a structure that the operative portions 45 of the L-shaped arms 44 of the retainer 4 are brought into direct contact with the pressure plate 2 to apply a load to the pressure plate. On the other hand, the clutch mechanism 200 has such a structure that the base plate 7 as a centrifugal load transfer means as shown in FIG. 6(b) is placed between the operative portions 45 of the L-shaped arms 44 and the pressure plate 2, as shown in FIG. 6(a). With respect to the other structural features, this embodiment is the same as the embodiment 1.

The base plate 7 has an annular portion 71 and plate portions 72 extending outward from the circumferential edge of the annular portion 71.

The plate portions 72 are located corresponding to, of the slits 34 of the diaphragm spring 3, those 34 which correspond to the L-shaped arms 44, and the plate portions have substantially the same shape as the slits 34.

By providing the base plate 7, the operative portions 45 of the L-shaped arms 44 bias the pressure plate 2 via the plate portions 72. By virtue of this, an area in which a centrifugal load is exerted on the pressure plate 2 is larger than that in the case where the pressure plate 2 is biased only with the operative portions 45 of the L-shaped arms 44.

Accordingly, the centrifugal load generated by swings of the L-shaped arms 44 is efficiently transferred to the pressure plate 2.

EMBODIMENT 3

Figure 7:
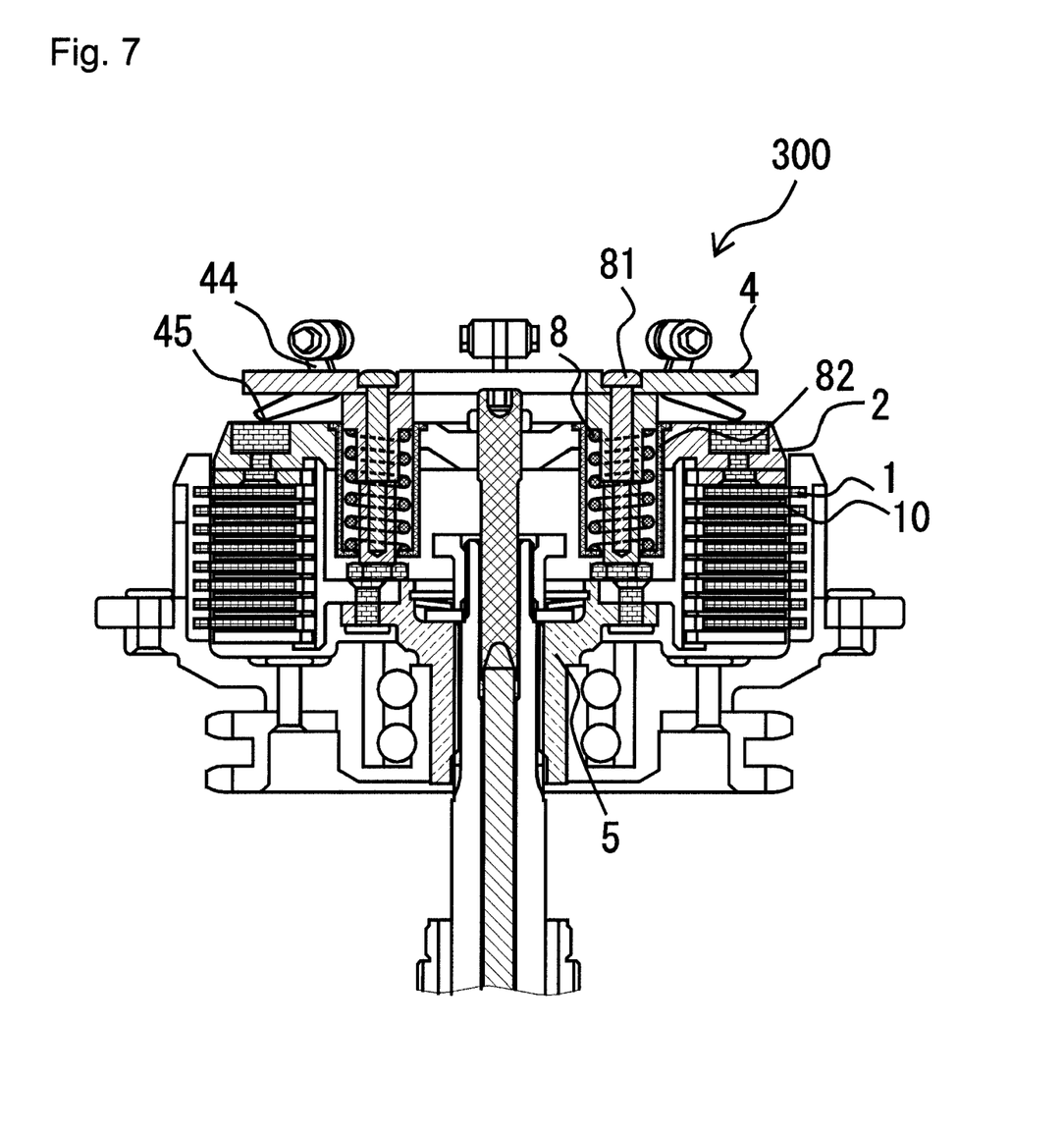
FIG. 7 is a sectional view of a clutch mechanism 300 as an embodiment 3 of the present invention.

FIG. 7 is a sectional view of a clutch disc(s) pressing assembly 300 as an embodiment 3 of the present invention.

As described in the above, each of the clutch mechanism 100 in the embodiment 1 and the clutch mechanism 200 in the embodiment 2 has such a structure that a diaphragm spring is used as an elastic load-applying means. On the other hand, the clutch mechanism 300 in the embodiment 3 uses coil springs 8 as elastic load-applying means. With respect to the other structural features, this clutch mechanism is the same as the clutch mechanism 100.

A retainer 4 is fixed to an inner hub 5 with bolts 81, and the coil springs 8 are so placed as to surround the bolts 81. By the fixing of the retainer 4, the coil springs 8 are subjected to a load by the retainer 4. The coil springs 8 apply pressing forces to a pressure plate 2 via spring cups 82. In other words, the coil springs 8 are so disposed as to be compressed between the retainer 4 and the pressure plate 2.

A value of the load generated by the elastic load-applying means in the clutch mechanism 300 is determined by the biases toward friction plates 1 which are applied to the pressure plate 2 by the coil springs 8.

Accordingly, in this embodiment, constant load applying means for generating the pressing force of the pressing mechanism which brings rotational driving force outputting members and rotational driving force receiving members into contact with each other are constructed of the coil springs 8.

A value of a load generated by centrifugal load-applying means is determined by centrifugal forces which are exerted on mass bodies 46 by rotation of the retainer 4 associated with rotation of an output system to move the mass bodies toward outside of the retainer 4. In other words, the value of the centrifugal load is determined by biases which are applied to the pressure plate 2 by operative portions 45 of L-shaped arms 44 by the centrifugal forces exerted on the mass bodies 46.

As described in the above, each of the clutch mechanisms in the embodiments 1 and 2 uses a diaphragm spring as an elastic load-applying means, and the clutch mechanism in the embodiment 3 uses coil springs as elastic load-applying means. Now, difference between characteristics of a diaphragm spring and coil springs will be described with reference to the schematic representation of FIG. 10. In the schematic representation shown in FIG. 10, the abscissa axis represents amount of movement of a clutch lever, and the ordinate axis represents force required for operating the clutch lever.

Figure 10:
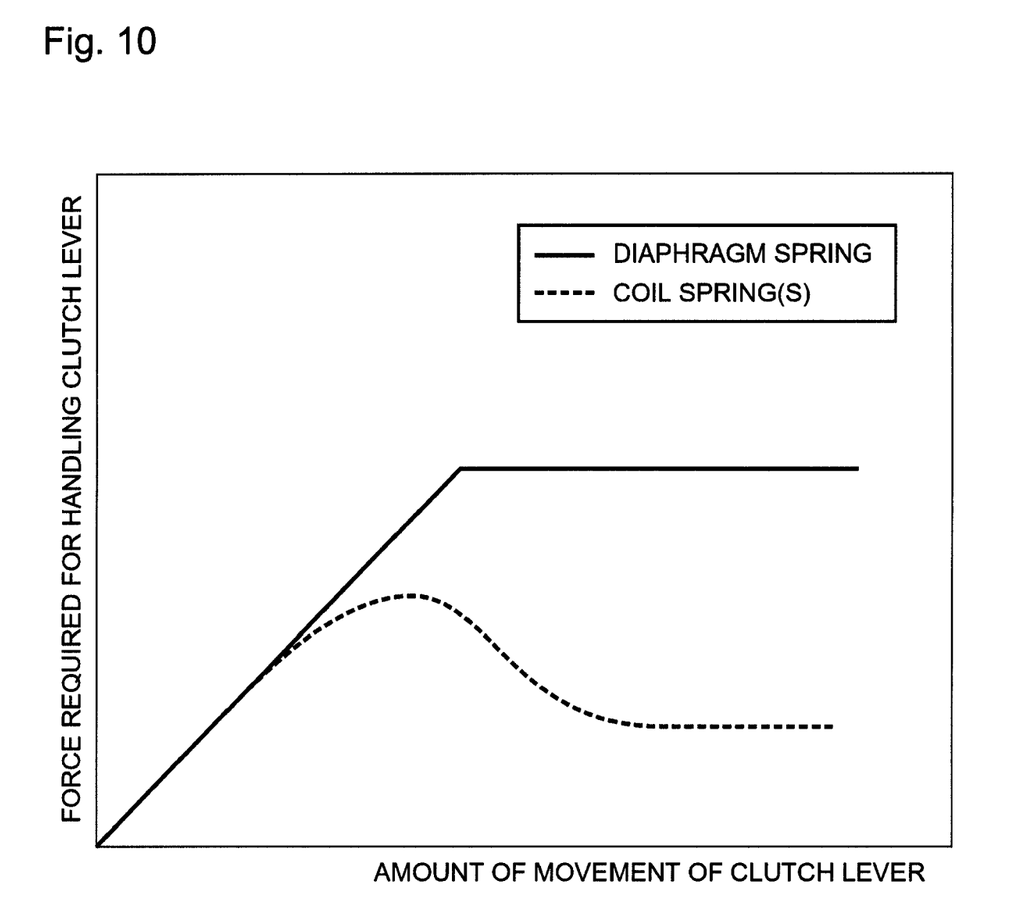
FIG. 10 is a schematic representation showing characteristics of the diaphragm spring and coil springs.

When coil springs are used, the coil springs are compressed in proportion to the amount of movement of the clutch lever, viz., amount of driver's grasping of the clutch lever. Accordingly, as shown in FIG. 10, a force for grasping the clutch lever, viz., "force required for operating the clutch lever" increases as the driver grasps the clutch lever more deeply, and thus a large force is required when the clutch lever is grasped deeply to the limit and this condition is maintained.

In comparison with this, a case where a diaphragm spring is used will be described. In an initial stage of holding of a clutch lever, viz., a stage where the diaphragm spring in a curved state is subjected to elastic deformation, a force with which a driver holds the clutch lever is substantially the same as in the case where the coil springs are used, as shown in FIG. 10. However, in a condition where the clutch lever is held to the limit and the diaphragm spring is elastically deformed substantially to flatness, a force for holding the clutch and keeping the holding is markedly small as compared with that in the case where the coil springs are used.

As described above, the diaphragm spring has excellent characteristics in operability of the clutch lever, as compared with the coil springs.

In the following, Example of the clutch mechanism as the embodiment 2 of the present invention will be given together with Comparative Example of a conventional clutch mechanism. In this connection, a two-wheeled motor vehicle used in this Example is a 2004 model of Harley Davidson® FLSTF/1455 cc.

EXAMPLE

Data on Example of the present invention is shown in Table 1.

The clutch mechanism according to this Example has an elastic load-applying means which biases a pressure plate toward friction plates with a constant load irrespective of number of revolutions of an output system, and centrifugal load-applying means which bias the pressure plate toward the friction plates with a load that increases as the number of revolutions of the output system increases. Accordingly, the elastic load and the centrifugal load were so determined that at an engine speed of 3000 rpm at which maximum torque was generated, the total of the elastic load and the centrifugal load were 246 lb, which was maximum non-slide limit, or more.

Specifically, the elastic load was set to be 220 lb. The value of 220 lb of the elastic load is 89% of 246 lb as the maximum non-slide limit. To obtain 220 lb as the set elastic load, the retainer ring diameter was determined to be 75 mm.

Further, in the clutch mechanism of this Example, the centrifugal load as a variable load with which the pressure plate 2 biases the pressure plates 1 was set to be 4.8 lb at 1000 rpm, 19.2 lb at 2000 rpm, 43.2 lb at 3000 rpm, 76.7 lb at 4000 rpm, and 119.9 lb at 5000 rpm.

This is because the engine speed at which the maximum non-slide limit was determined was 3000 rpm and the maximum non-slide limit was 246 lb, and accordingly, the variable load was so set as to satisfy W/maximum non-slide limit= (220+43.2)/246=1.070.

At the same time, the variable load was so set as to satisfy $0.0048 \leq$ variable load/engine speed (lb/rpm)$\leq 0.024$, when the engine speed was in a range of 1000 rpm to 5000 rpm.

By providing the constant load and the variable load as described above, the safety factor for ensuring slide prevention is obtained and comfortable clutch operability is attained.

In the clutch mechanism, its swing members were made of an aluminum alloy and its mass bodies were made of a brass.

TABLE 1

Data on Clutch Mechanism according to the Invention

| A engine speed (rpm) | elastic load (lb) | B centrifugal load (lb) | total load (lb) | force required for operating control lever (Kg) | B/A | ratio of the required force to that of conventional mechanism (%) |
|---|---|---|---|---|---|---|
| 1000 | 220 | 4.8 | 224.8 | 4.8 | 0.0048 | 60 |
| 2000 | 220 | 19.2 | 239.2 | 5.3 | 0.0096 | 65 |
| 3000 | 220 | 43.2 | 263.2 | 6.0 | 0.0144 | 75 |
| 4000 | 220 | 76.7 | 296.7 | 7.3 | 0.0192 | 90 |
| 5000 | 220 | 119.9 | 339.9 | 8.7 | 0.0240 | 108 |

Comparative Example

Figure 8:
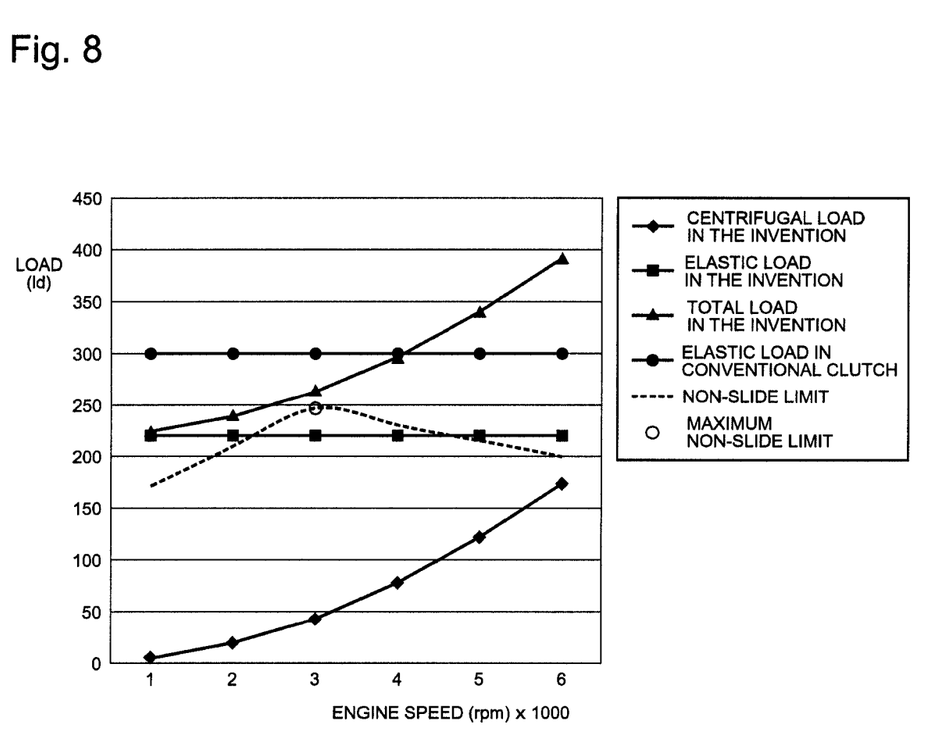
FIG. 8 is a graphical representation which compares data on the clutch mechanism 200 as the embodiment 2 of the present invention with data on a conventional clutch mechanism.

Data on a conventional clutch mechanism is shown in Table 2. Further, a graph which compares the data shown in Table 1 with the data shown in Table 2 is shown in FIG. 8.

The conventional clutch mechanism in this Comparative Example comprises a pressure plate, a diaphragm spring and a retainer and has such a structure that the retainer is provided with no centrifugal mechanisms. Accordingly, the conventional clutch mechanism uses only such an elastic load that the diaphragm spring presses the pressure plate with a constant load irrespective of an engine speed.

The clutch mechanism in Comparative Example has a retainer ring diameter of 95 mm. When this is compared with the clutch mechanism in the above-described Example, it is understood that the positions at which the levers of the diaphragm spring are pressed by the protuberances of the retainer in the clutch mechanism in Example are inward shifted by 20 mm as compared with those in the clutch mechanism in Comparative Example.

The elastic load in the clutch mechanism of Comparative Example is constant at 300 lb irrespective of the engine speed. In this case, a force required for operating a clutch lever is constant at 8.0 kg.

The ground on which the elastic load is set to be 300 lb is as follows. In a two-wheeled motor vehicle in this Comparative Example, the maximum torque is 11.0 kg·m at 3000 rpm, and from this value, the minimum of a load capable of preventing occurrence of slide between friction plates and clutch plates, i.e., the maximum non-slide limit is calculated to be 246 lb. By providing the maximum non-slide limit of 246 lb with a margin, 300 lb is set as the elastic load.

As described above, in the clutch mechanism in the two-wheeled motor vehicle of Comparative Example, the elastic load is determined from the value of the maximum torque and set to be constant irrespective of the engine speed. Accordingly, the elastic load is in excess of a required level in a range where the maximum torque is not generated, particularly in a range where the engine speed is low. Because of this reason, in the two-wheeled motor vehicle in Comparative Example which has a large engine torque, a force required for operating a clutch lever is large.

TABLE 2

Data on Conventional Clutch Mechanism

| engine speed (rpm) | elastic load (lb) | force required for operating clutch lever (Kg) |
|---|---|---|
| 1000 | 300 | 8.0 |
| 2000 | 300 | 8.0 |
| 3000 | 300 | 8.0 |
| 4000 | 300 | 8.0 |
| 5000 | 300 | 8.0 |

Figure 9:
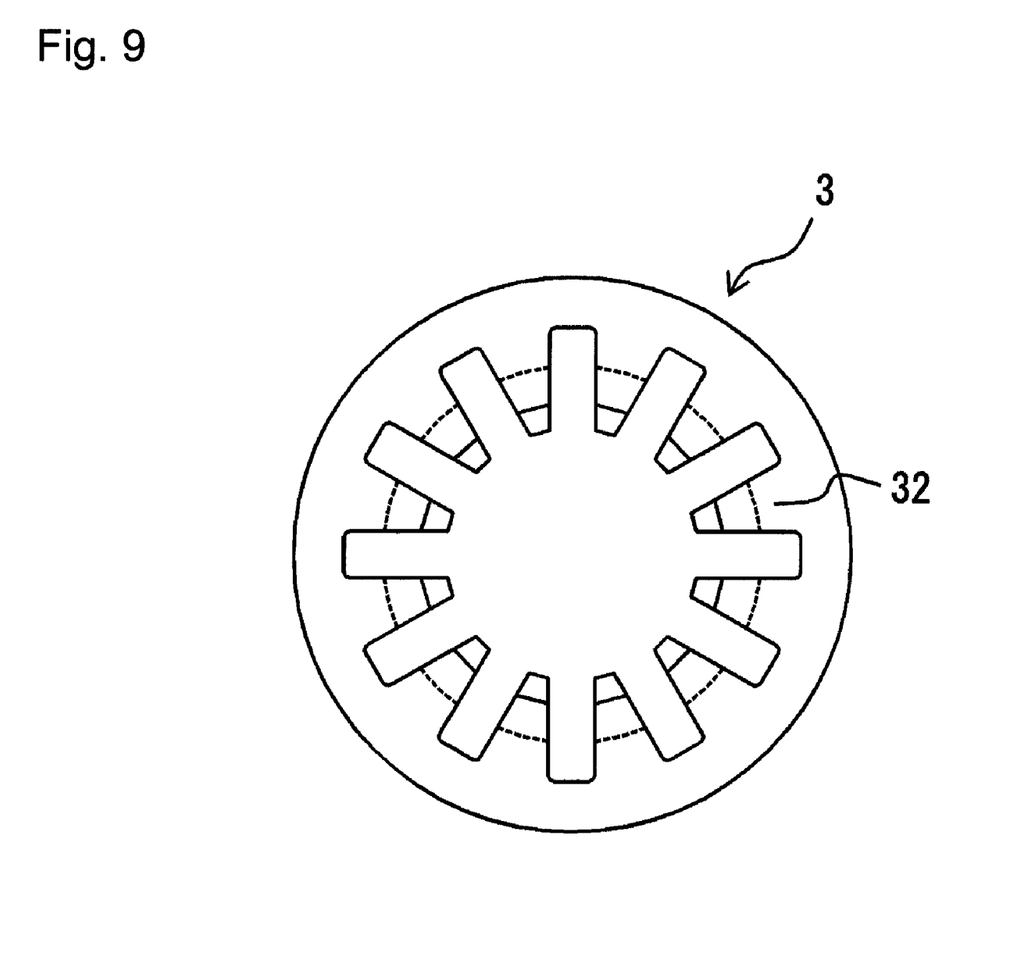
FIG. 9 is a view showing lever pressing positions in the diaphragm spring.

In FIG. 9, positions shown in lever portions 32 in solid line are those at which the levers 32 are pressed in Example, and positions shown in dotted line are those at which levers are pressed in Comparative Example. In this manner, the positions at which the levers 32 are pressed are radially inward shifted, and the levers 32 are thereby elastically deformed more easily.

It is seen from Table 1 and FIG. 8 that in the clutch mechanism of Example, the total of the constant load and the variable load ① exceeds the non-slide limits over the whole range of the engine speed, and ② is less than the maximum non-slide limit at an engine speed of 2000 rpm or lower and is (equal to or) more than the maximum non-slide limit at an engine speed of 3000 rpm, at which the maximum torque is generated, or higher due to the increase of the centrifugal load.

As described above, the clutch mechanism according to the present invention has the centrifugal mechanisms which generate the centrifugal load that increases as the engine speed increases. Accordingly, the total of the elastic load and the centrifugal load is so variable as to exceed the maximum non-slide limit at the engine speed at which the maximum torque is generated. By virtue of this, while enabling reduction of the elastic load, it is possible to ensure such a total load that the press contact between the friction plates and the clutch plates is capable of preventing slide therebetween.

By reducing the elastic load to a level lower than the maximum non-slide limit, i.e., by rendering the retainer ring diameter smaller as compared with that in the conventional clutch mechanism, as is evident from Table 1, the force required for operating the clutch lever is reduced to be lower at an engine speed up to 4000 rpm as compared with that in the conventional clutch mechanism.

Further, it is seen from FIG. 8 that the total load in Example becomes equal to the elastic load in the conventional clutch mechanism when the engine speed exceeds 4000 rpm, and conversely, the total load in Example is in excess of the elastic load in the conventional clutch mechanism at 5000 rpm due to the increase of the centrifugal load. As is also seen from Table 1, the force required for operation of the clutch lever is also greater than that in the conventional clutch mechanism at an engine speed of 4000 rpm or more.

In a two-wheeled motor vehicle to which the present invention is mainly intended to be applied, however, its engine torque is likely to be high. In a case of such a two-wheeled motor vehicle, its engine speed is likely to be, at most, of the order of 3000 rpm during ordinary running.

It is, therefore, apparent that in ordinary running, use of the clutch mechanism according to the present invention enables the force required for operating a clutch lever to be realized which is reduced as compared with that of the conventional clutch mechanism.

INDUSTRIAL APPLICABILITY

As described above, the present invention is applicable to a clutch mechanism of a motor vehicle such as a two-wheeled motor vehicle, a four-wheeled motor vehicle or the like.

The invention claimed is:

1. A method for reducing driver's burden in operation of a clutch mechanism, said clutch mechanism comprising:

rotational driving force outputting members connected to a rotational driving force input system;

rotational driving force receiving members connected to a rotational driving force output system;

a pressing mechanism for pressing said rotational driving force outputting members against said rotational driving force receiving members to keep said rotational driving force outputting members and said rotational driving force receiving members in contact with each other; and a disengaging means for releasing said rotational driving force outputting members and said rotational driving force receiving members from the pressing force which keeps them in contact with each other;

said pressing mechanism having an elastic load applying means and a centrifugal load applying means for together generating the pressing force which brings and keeps said rotational driving force outputting members and said rotational driving force receiving members in contact with each other, a value of the pressing load generated by said elastic load applying means and said centrifugal load applying means being kept in excess of a non-slide limit which is required for keeping said rotational driving force outputting members and said rotational driving force receiving members in contact with each other to transfer the rotational driving force and which varies along a torque curve and reaches its maximum at the maximum of the driving force transferred from said rotational driving force input system to said rotational driving force output system, a value of a load generated by said elastic load applying means being set to be less than the maximum non-slide limit, i.e., the maximum of the non-slide limit, said method comprising:

setting the value of the load generated by said elastic load applying means to be in a range of more than 70% and 90% or less of the maximum non-slide limit.

2. A method for reducing driver's burden in operation of a clutch mechanism, said clutch mechanism comprising:

rotational driving force outputting members connected to a rotational driving force input system;

rotational driving force receiving members connected to a rotational driving force output system;

a pressing mechanism for pressing said rotational driving force outputting members against said rotational driving force receiving members to keep said rotational driving force outputting members and said rotational driving force receiving members in contact with each other; and a disengaging means for releasing said rotational driving force outputting members and said rotational driving force receiving members from the pressing force which keeps them in contact with each other;

said pressing mechanism having an elastic load applying means and a centrifugal load applying means for together generating the pressing force which brings and keeps said rotational driving force outputting members and said rotational driving force receiving members in contact with each other, a value of the pressing load generated by said elastic load applying means and said centrifugal load applying means being kept in excess of a non-slide limit which is required for keeping said rotational driving force outputting members and said rotational driving force receiving members in contact with each other to transfer the rotational driving force and which varies along a torque curve and reaches its maximum at the maximum of the driving force transferred from said rotational driving force input system to said rotational driving force output system, a value of a load generated by said elastic load applying means being set to be less than the maximum non-slide limit, i.e., the maximum of the non-slide limit, said method comprising:

setting the value of the load generated by said centrifugal load applying means to satisfy the following formula I, when the value of the pressing load generated by said elastic load applying means and said centrifugal load applying means at a maximum of the rotational driving force which is transferred from the rotational driving force input system to the rotational driving force output system, i.e., a total of the value of the variable load at the engine speed at the maximum of the rotational driving force and the value of the constant load is represented by W:

$$1.01 \leq W/\text{maximum non-slide limit} \leq 1.10 \qquad \ldots \text{I.}$$

\* \* \* \* \*